United States Patent
Raugas et al.

(10) Patent No.: US 9,288,220 B2
(45) Date of Patent: Mar. 15, 2016

(54) METHODS AND SYSTEMS FOR MALWARE DETECTION

(71) Applicant: Cyberpoint International LLC, Baltimore, MD (US)

(72) Inventors: Mark V. Raugas, Baltimore, MD (US); Rebecca A. Borbely, Baltimore, MD (US); Michael W. West, Ellicott City, MD (US); James L. Ulrich, Potomac, MD (US)

(73) Assignee: CyberPoint International LLC, Baltimore, MD (US)

( * ) Notice: Subject to any disclaimer, the term of this patent is extended or adjusted under 35 U.S.C. 154(b) by 98 days.

(21) Appl. No.: 13/998,513

(22) Filed: Nov. 7, 2013

(65) Prior Publication Data

US 2015/0128263 A1 May 7, 2015

(51) Int. Cl.
*G06F 12/14* (2006.01)
*H04L 29/06* (2006.01)

(52) U.S. Cl.
CPC .......... *H04L 63/1408* (2013.01); *H04L 63/145* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 8,645,291 B2 * | 2/2014 | Hawkins | ............... | G06N 99/005 706/12 |
| 8,800,044 B2 | 8/2014 | Raad | | |
| 8,839,418 B2 * | 9/2014 | Hulten | ............... | G06F 17/30887 726/22 |
| 8,893,273 B2 * | 11/2014 | Honig | ................... | G06F 21/554 713/189 |
| 9,088,601 B2 * | 7/2015 | Friedrichs | ........... | H04L 63/1416 |
| 9,185,095 B1 * | 11/2015 | Moritz | ................... | H04L 63/08 |
| 9,208,215 B2 * | 12/2015 | Mahaffey | .......... | G06F 17/30598 |
| 2005/0022004 A1 * | 1/2005 | Mihcak et al. | ................ | 713/200 |
| 2007/0192855 A1 * | 8/2007 | Hulten et al. | ................... | 726/22 |
| 2009/0044276 A1 * | 2/2009 | Abdel-Aziz | .......... | H04L 63/145 726/24 |
| 2010/0284283 A1 * | 11/2010 | Golic et al. | ................... | 370/242 |
| 2011/0252472 A1 * | 10/2011 | Ehrlich et al. | ................... | 726/22 |
| 2011/0302653 A1 * | 12/2011 | Frantz et al. | ..................... | 726/22 |
| 2012/0198549 A1 * | 8/2012 | Antonakakis et al. | .......... | 726/22 |
| 2012/0210423 A1 * | 8/2012 | Friedrichs et al. | .............. | 726/22 |
| 2014/0041028 A1 * | 2/2014 | Ramsey et al. | ................. | 726/22 |
| 2014/0282586 A1 * | 9/2014 | Shear et al. | ................... | 718/104 |

(Continued)

OTHER PUBLICATIONS

Mohamed Hamdi, Noureddine Boudriga; Detecting Denial-of-Service attacks using the wavelet transform; Jun. 29, 2007; Computer Communications 30; pp. 3203-3213.*

(Continued)

*Primary Examiner* — Jason K. Gee
*Assistant Examiner* — Olanrewaju Bucknor
(74) *Attorney, Agent, or Firm* — Fish & Richardson P.C.

(57) ABSTRACT

Methods, system, and media for detecting malware are disclosed. A network may be monitored to collect samples of the network traffic. Feature vectors may be extracted from the sampled network traffic. One or more machine learning models may be applied to the feature vectors to produce a score indicative of the presence of a particular type of malware. One or more scores obtained by applying the machine learning models may be fused by another machine learning model into a resulting score. A threshold value may be calculated to accompany a score indicating the likelihood that the traffic sample indicates the presence of malware and the likely effectiveness of planned remediation effort. An alert may be generated from the score and the threshold when the threshold is acceded.

23 Claims, 5 Drawing Sheets

(56) References Cited

U.S. PATENT DOCUMENTS

2014/0301222 A1* 10/2014 Nakamura et al. ............ 370/252
2015/0082433 A1 3/2015 Harlacher et al.

OTHER PUBLICATIONS

Stavros N. Shiaeles et al.; Real time DDoS detection using fuzzy estimators; Sep. 2012; Computers and Security vol. 31, Issue 6, pp. 782-790.*

Asaf Shabtai et al.; Detection of malicious code by applying machine learning classifiers on static features, Feb. 2009; vol. 14, Issue 1; pp. 16-29.*

International Search Report and Written Opinion dated Jan. 30, 2015 for International Application No. PCT/US2014/063530, 11 pages.

Florian Tegeler et al: "BotFinder",Emerging Networking Experiments and Technologies, ACM, 2 Penn Plaza, Suite 701 New York NY 10121-0701 USA (Dec. 10, 2012), pp. 349-360, DOI: 10.1145/2413176.2413217; ISBN: 978-1-4503-1775-7.

Aggelos Kiayias et al: "A Combined Fusion and Data Mining Framework for the Detection of Botnets", Cybersecurity Applications& Technology Conference for Homeland Security, 2009. CATCH '09. IEEE, Piscataway, NJ, USA, (Mar. 3, 2009), pp. 273-284, ISBN: 978-0-7695-3568-5.

Ethan Menahem et al: "Improving malware detection by applying multi-inducer ensemble", Computational Statistics and Data Analysis, North-Holland, Amsterdam, NL, vol. 53, No. 4, (Feb. 15, 2009), pp. 1483-1494, ISSN: 0167-9473, DOI: 10.1016/J.CSDA.2008.10.015.

Nikolaos Chatzis et al: "Email worm detection by wavelet analysis of DNS query streams",IEEE Symposium on Computational Intelligence in Cyber Security, 2009. CICS '09. IEEE, Piscataway, NJ, USA, Mar. 30, 2009, pp. 53-60, ISBN: 978-1-4244-2769-7.

Jian Kang et al: "Application Entropy Theory to Detect New Peer-to-Peer Botnet with Multi-chart CUSUM", Second International Symposium on Electronic Commerce and Security, 2009. ISECS '09. IEEE, Piscataway, NJ, USA, 22 (May 22, 2009), pp. 470-474, ISBN: 978-0-7695-3643-9.

* cited by examiner

METHODS AND SYSTEMS FOR MALWARE DETECTION

FIELD

This disclosure relates generally to malware detection, and more particularly to methods and systems for malware detection in a computer network.

BACKGROUND

With the abundance of new or modified malware being introduced daily on the Internet, network defense personnel are faced with the increasingly difficult challenge of identifying and analyzing a continuous stream of collected software samples in order to produce accurate and reliable signatures with which to defend against future attacks.

The following references discuss malware detection services and background related thereto: Bayesian Networks: Koller, Daphne and Nir Friedman. *Probabilistic Graphical Models: Principles and Techniques*. Cambridge, Mass.: MIT Press, 2009, page 45; Probabilistic Graphical Models (PGM) Koller, Daphne and Nir Friedman. *Probabilistic Graphical Models: Principles and Techniques*. Cambridge, Mass.: MIT Press, 2009, p. 3; Support Vector Machines (SVM) and Gaussian Mixture Models (GMM): Machine Learning: An Algorithmic Perspective (Chapman & Hall/Crc Machine Learning & Pattern Recognition) Chapman and Hall/CRC; 1 edition (Apr. 1, 2009); TCP/IP Protocol: Kevin R. Fall and W. Richard Stevens, TCP/IP Illustrated, 2nd ed., Pearson Education, Ann Arbor, Mich.: 2012; Malware Network Behavior:, "Port Scanning", P. Mateti, http://www.cs.wrightedu/pmateti/InternetSecurity/Lectures/Probing/index.html; Flow Based Malware Detection: M. Skrzewski, "Flow Based Algorithm for Malware Detection", in Computer Networks, 18th Conference, CN 2011 Proceedings, Springer, Berlin: 2011; General Malware Detection: E. Raftopolous, M. Dimitropoulos, "Detecting, Validating, and Characterizing Computer Infections in the Wild," IMC '11, ACM: Berlin, 2011; and Malware Network Behavior: M. Krzywinski, Port Knocking: Network Authentication Across Closed Ports", sysAdmin Magazine, 12:12-17 (2003). Each of these references are hereby incorporated herein by reference in their entireties.

However, existing malware detection services suffer from several deficiencies. Existing malware detection approaches use either signature-based malware detection or require a priori knowledge of specific malware characteristics or behaviors gleaned from manual identification. Yet, signatures are usually not available when new or modified malware is first introduced. Without the signatures, signature-based identification cannot be used to detect new or modified instances of malware. Similarly, a priori knowledge of specific malware characteristics or behaviors gleaned from manual identification requires advanced knowledge of the malware and/or manual classification. Yet, this knowledge may not be known beforehand for new or modified malware.

What is needed is a design such that as malware threats change and evolve, never-before-seen malware can be accurately identified using machine learning techniques.

SUMMARY

Systems and methods are described to detect malware in a computer network using supervised machine learning techniques. Network traffic may be sampled for a configurable time window. Features may be extracted from the network traffic samples. One or more machine learning models may be applied to the features generating a score representing some probability that malware exists on a particular networked device in the network. No signature or advanced knowledge of the malware and/or manual classification may be required. The malware determination may be accomplished using supervised machine learning where previously trained machine learning models are applied to the extracted features to generate a score indicating the likelihood that the sample of network traffic includes malware.

In one or more embodiments, the network traffic samples may be associated with a particular host or network device.

One or more embodiments may include a fuser that may combine the scores from one or more machine learning models generating a new score.

One or more embodiments may include a calculated threshold generated by the fuser representing a level above which a user or receiving machine may be notified that malware is likely to be present.

One or more embodiments may include a calculated threshold generated by the fuser representing a level above which remediation attempts against the malware are likely to be successful.

In one or more embodiments, an alert may be generated from the score and the threshold wherein the alert may be provided to a user or receiving machine for the purpose of mitigating against the presence of malware in a network device.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which.

DETAILED DESCRIPTION OF THE DRAWINGS

Figure 1:
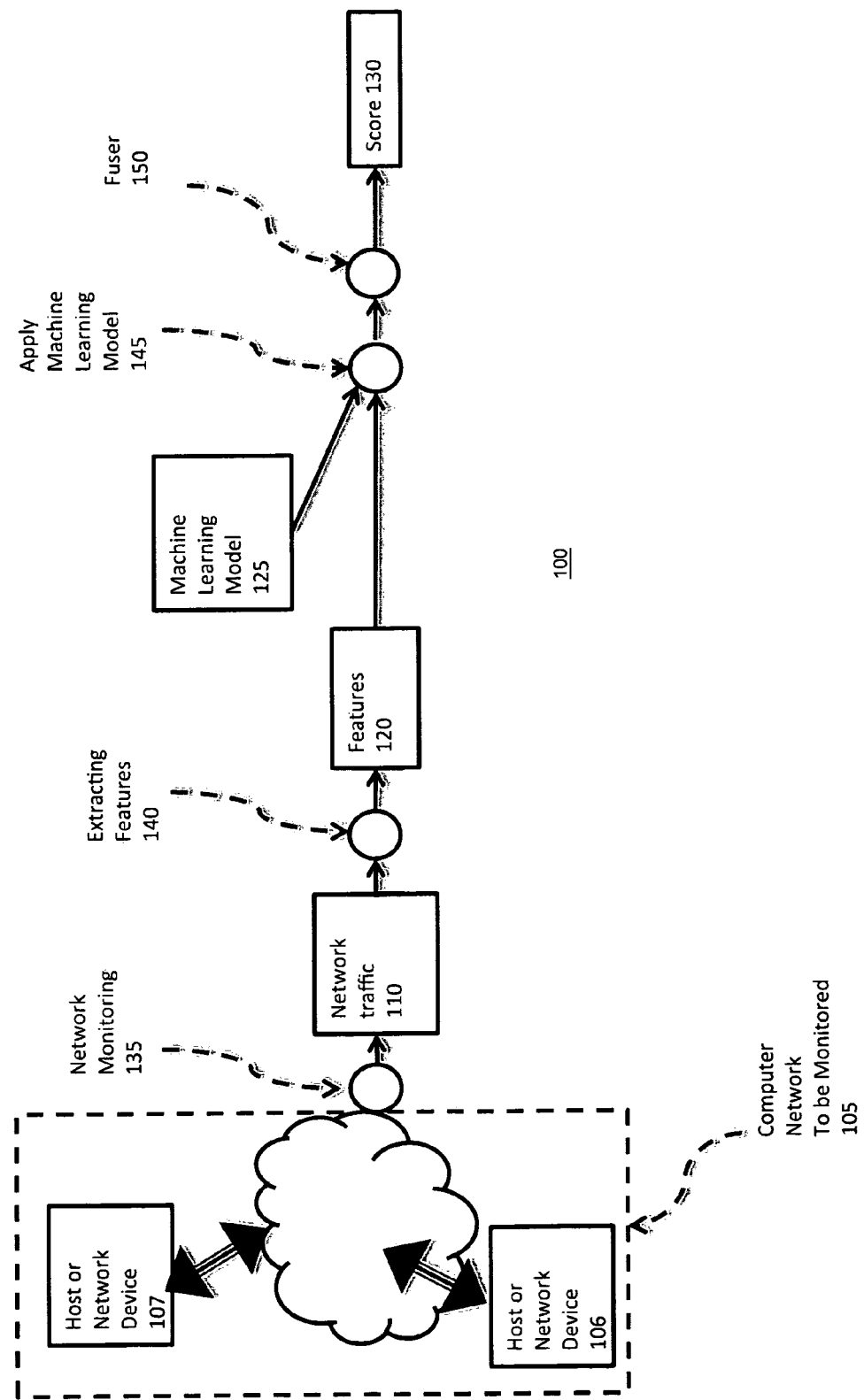
FIG. 1 depicts a block diagram of an exemplary system wherein computer network traffic from a computer network may be sampled and features may be extracted from the network traffic.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

A system, method, medium, or computer based product may provide tools for real-time detection and classification of advanced malware using supervised machine learning applied specifically to network-observable features associated with malicious behavior, including Command & Control, data exfiltration, and beaconing. This may reduce the time window between threat identification and defensive response.

In one or more embodiments, the system and method described herein may identify new and unknown threats to an organization's network or computing resources. Although an organization's network may already utilize Network Intrusion Detection (IDS) and AntiVirus (AV) systems and/or software to provide detection against known threats (e.g., those software components/programs for which a 'signature' is known), the organization may also need protection for their network against new unknown threats. These unknown threats may comprise new potentially malicious software components that potentially could infect the organization's computing resources. Potential new means of infection (e.g. installation or execution) of the software may include, but are not limited to, downloading via network interface, out-of-band infection (e.g., removable media), bad-actor infection, from a pre-infected computing system, or any combination thereof. The disclosed systems and methods may protect against these unknown threats by identifying potentially malicious software components or programs that may be executing on the organizations computing resources.

The systems, methods, media, or computer based products for malware detection discussed herein may ingest samples of network traffic passing to and/or from each computing resource selected for monitoring. For example, a span port located inside an Internet Service Provider's (ISP) network point-of-presence (POP) would permit monitoring of many computing resources simultaneously. Using one or more methods of feature extraction, the network samples may be prepared for scoring. Subsequently, a specific machine learning algorithm may use models trained a priori against specific and/or known classes of malware to compute rankable scores (for a given time window). The scores may indicate whether particular hosts or network devices exhibit network behavior most similar to a particular class of malware.

In one or more embodiments, scores may be computed, and the scores may be compared to thresholds generating alerts, which can be deployed for threshold-based remediation or escalation or triage, e.g. selection of hosts most likely to contain previously undetected malicious software. For example, an alert may be generated based on a score exceeding a threshold. In some examples, the alert may be provided to a user or a device for invoking a remediation strategy. The scores may also be an aggregation of the above factors across multiple network based malware detection systems, methods, mediums, or computer based products. For example, if system A monitors Group A within an organization, and system B monitors Group B, the combined score list may provide a unified assessment of which computing resources within Group A and/or Group B exhibit behavior indicative of a class of malicious software.

FIG. 1 depicts a block diagram of an exemplary system 100 in accordance with one or more embodiments wherein a computer network 105 may include one or more user devices, hosts or network devices 106 and block 107. In system 100, computer network traffic from a computer network may be sampled and features may be extracted from the network traffic, and a machine learning model may be applied to the features to generate a resulting score.

The one or more user devices 106 and 107 may be any type of computing device, including a mobile telephone, a laptop, tablet, or desktop computer having, a netbook, a video game device, a pager, a smart phone, an ultra-mobile personal computer (UMPC), a personal data assistant (PDA), etc. The one or more user devices may run one or more applications, such as Internet browsers, voice calls, video games, videoconferencing, and email, among others. The one or more user devices may be any combination of computing devices. These devices may be coupled to network 105.

Network 105 may provide network access, data transport and other services to the devices coupled to it. In general, network 105 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 105 may, again as an alternative or in conjunction with one or more of the above, implement a WiMAX architecture defined by the WiMAX forum. Network 105 may also comprise, for instance, a local area network (LAN), a wide area network (WAN), the Internet, a virtual LAN (VLAN), an enterprise LAN, a layer 3 virtual private network (VPN), an enterprise IP network, or any combination thereof.

Network 105 may be monitored, thereby generating samples of network traffic 110. Network traffic may be monitored by one or more computing devices. The network traffic may include any information being transmitted over a network, e.g. traffic between device 106 and user device 107 over network 105. Samples of network traffic may include sFlow derived from sampled traffic, copies of whole captured packets from the network traffic, Internet Protocol Flow Information Export (IPFIX) derived from sampled traffic, Netflows derived from sampled traffic, or packet captures (PCAP) of some or all of the packets in the network traffic. Network traffic may be monitored by monitoring device 135 during a time configurable time interval. The time interval may be specified in a configuration file, by an administrator, or by a user, and may correspond to the window over which feature vectors are constructed. Sampled network traffic may be associated with one or more computing devices. For example, the network traffic may include traffic flowing to or from a particular device on the network which may be executing malware. Network monitoring 135 may be configured to associate network samples on a particular subset of traffic associated with a particular suspect host or network device.

Features 120 may be extracted from the sampled network traffic in block 140. The features may be configured and handled as individual items, as a part of feature sets, or any combination thereof. Features may include any or several network statistics. In one or more embodiments, features may comprise only a subset of monitored or examined network data computed during the configurable time interval ("window"). The following are examples of the features 140 that may be used:

Feature set A: Count of distinct connections. Each 1-dimensional feature vector may provide the total number of distinct connections, which are taken to be unordered (source IP address:port, destination IP address:port) pairs. The count may be restricted to those Ethernet packets determined to wrap IP network-layer packets wrapping, in turn, UDP or TCP transport-layer packets. This feature may be intended to detect, in part, IP source address "spoofing" attacks, such as those described in Fall et al. (2012), section 5.7, as spoofing, a variety of source IP addresses within the span of a single packet capture session would result in a larger than expected number of distinct connections. It may also detect attempts to execute port knocking sequences, such as those defined in Krzywinski (2003).

Feature set B: Average entropy per packet. The Shannon entropy may be computed on a byte-level basis against the packet payload, across all TCP or UDP packets encountered in the capture. A histogram may be maintained that encompasses all bytes encountered in any packet, and the per-byte probability is evaluated as the number of encounters for a given byte divided by the sum of encounters for all bytes. The resulting Shannon entropy value may then divided by the number of UDP or TCP packets encountered, to normalize the value across captured files or samples of network traffic. This feature may serve to detect encrypted communications (encryption corresponding to higher entropy).

Feature set C: Overall entropy across packets. This may be the same as feature set B above, but without the normalization factor.

Feature set D: Time series formed by entropies of successive packets. This may be similar to feature set B, except that the entropy may be computed for each TCP or UDP packet encountered, and the feature vector may be the series of entropy values thus obtained. For computational feasibility, when used with Adapted Gaussian Mixture Models, the feature vectors may be separated into smaller chunks of equal dimension, so that that each packet capture example is represented in the test and training data by a set of feature vector samples. In one or more embodiments, for computational feasibility, only the first 256 packets (at most) are considered. Zero padding may be used for the last sample vector, for capture files containing a number of packets that is not a multiple of the chunk size.

Feature set E: Time series formed by sizes of IP packets. The packets may be processed in sequence. For each IP packet encountered, the IP total length (header plus payload) may be recorded, for up to the first 256 packets. When used with adapted GMMs, the data are chunked in the same manner as that used for feature set D. This feature may be intended in part to detect "amplification" denial of service (DoS) attacks, in which a sequence of small request packets engender significantly larger packets in response, such as those described in reference Fall et al., section 11.12.

Feature set F: Time series formed by successive destination port accesses, across connections.

The packets may be processed in sequence. For each UDP or TCP packet encountered, the destination port may recorded, for up to the first 256 packets. When used with Adapted Gaussian Mixture Models, the data may be chunked in the same manner as that used for feature set D. This feature is intended in part to detect port scanning across hosts, such as the port scanning discuss in reference Mateti (2011).

Feature set G: Mean and Variance of distinct TCP sequence numbers per packet associated to a connection. The packets may be processed in sequence. For each distinct connection encountered, to which at least one TCP packet is associated, a list of distinct TCP sequence numbers may be established. The size of the list may be normalized by the number of packets encountered for the connection, and the mean and variance of the resulting value may be computed across connections. This feature is intended in part to detect TCP connection management attacks, such as those described in reference Fall et al. (2012), section 13.8.

Feature set H: Packets per unit time. This feature may simply count the number of packets of any type encountered in the packet capture data. Since capture data for all Corpus II examples were taken over a two minute span, the feature is essentially packets per unit time with the unit of time set to two minutes. However, the unit of time may be any unit of time. This feature is intended in part to detect DoS attacks; for example, see reference Fall et al. (2012), section 14.11.

Feature set I: Packet size mean and variance (across connections). This feature may compute the mean and variance of packet size across all IP packets encountered in the capture data. It may be useful in part in detecting MTU-based attacks reference (reference Fall et al. (2012), section 13.8). Like feature K below, it may also be useful in attempting to identify malware that seeks to avoid detection under traffic volume analysis.

Feature set J: Mean and variance of difference in bytes sent between peers of UDP or TCP connections. For each UDP or TCP connection encountered in the packet capture data, the difference in bytes transmitted by each peer in the connection may be established. The mean and variance of this value may then be computed across connections. This feature is intended in part to detect malware that attempts to download other malware.

Feature set K: Mean number and variance of packets associated to a connection.

This feature is similar to feature H. The number of TCP or UDP packets encountered for each distinct connection discovered in the packet capture data may be established, and from this histogram, the mean and variance of the number of packets per connection may be computed. This feature is intended in part to detect malware that may attempt to "fly below the radar" by sending a small, steady stream of information to a host, such as described in reference Skrzewski (2011).

Feature set L: Ratio of DNS lookups to number of distinct destination IP addresses (TCP or UDP packets). The packets may be scanned in sequence, and a list of distinct destination IP addresses found in any TCP or UDP packet may be maintained, together with a count of TCP or UDP packets referencing port 53. The size of the list may then be divided by the count. The feature is intended to detect applications making direct connections to hosts without a DNS lookup.

Feature set M: Mean and variance of distinct ip addresses per port. For each distinct destination port encountered in any TCP or UDP packet, the count of distinct destination IP addresses contained in packets referencing the destination port is established. From these data the mean and variance of the distinct destination IP addresses per destination port may be computed. This feature is designed to detect applications that seek to connect to the same port on a large number different hosts (e.g. "host scanning" as in reference Raftopolous et al. (2011)).

Feature set N: Percentage of packets per top-level packet type. The percentages of UDP, TCP, ARP, ICMP, and raw IP (IP packets wrapping no discernible higher-level packet) may be computed, across all packets found in the capture data.

This feature is intended in part to detect ARP and ICMP-based attacks, such as those described in reference Fall et al. (2012), sections 4.11 and 8.7.

Feature set O: Number of SYNs and FINs per time window. The total number of TCP packets across connections, having the SYN flag set may be established, and similarly for the FIN flag. These flags are part of the TCP protocol specification and are either set (1) or not set (0). This feature is intended in part to detect SYN flood attacks and other TCP connection management attacks, such as those described in reference Fall et al. (2012), section 13.8.

Feature set P: Mean and variance of distinct ports per IP address. This is the converse of feature M. For each distinct destination IP address encountered in any TCP or UDP packet, the count of distinct destination ports contained in packets referencing the destination IP address is established. From these data the mean and variance of the distinct destination ports per destination IP address are computed. This feature is designed to detect applications that seek to connect to the same host on a large number of different ports (e.g. "port scanning", such as the port scanning in reference Raftopolous et al. (2011)).

Feature set Q: Discrete wavelet transformations (DWTs) of selected combinations of features. The individual network features may be combined and transformed via discrete wavelet transformations, described above in the section covering host-based features. This transformation is denoted as Q (F1; F2; ...; Fn) where the Fi are the individual features selected. The particular wavelet transformation used is the [PyWave] implementation of the DAUB4 transformation, using level n−1, where 2^n is the size of the feature vector.

Feature set R: FFTs of selected combinations of features. This transformation is similar to that of feature Q, except that a discrete (fast) Fourier transform (FFT) is performed. This transformation is denoted as R (F1; F2; ____; Fn).

Machine learning models may include a set of supervised learning algorithms, such as Boosted Decision Trees, Support Vector Machines, and Gaussian Mixture Models. The machine learning models may be specified in a predefined configuration or by a user. The machine learning modules receive the extracted features as inputs, and produce scores as outputs for each input. The scores are produced using the provided feature vector as input to the specified model and model configuration (e.g., Support Vector Machine with a trained SVM model). A statistical confidence may be associated with detection events for indicating the effectiveness of potential remediation policy or actions. In one embodiment of this invention, the training process may include generation of statistics associated with the accuracy and performance of the Machine Learning Model wherein the statistics may include the statistical means of the predicted output scores for positive and negative samples. For example, the statistics may include a network traffic training score based on similarity to malicious behavior by software executing on a network-connected host system, a second network traffic training score based on similarity to benign behavior by software executing on a network-connected host system, and a network traffic training score based on similarity to malicious behavior associated with specific classes of malware. The statistics may also include statistical standard deviations of the predicted output scores for positive and negative samples. For example, scores may be used to identify computing resources on the network that, with likelihood p, are executing a malicious software program and/or with likelihood p', may host a malicious software program of a specific type or class. For example, malware may include a malicious software program, a virus, a worm, a trojan horse, a rootkit, a keylogger, spyware, adware, or rogue security software.

The emitted scores may be normalized to the range [0.0, 1.0], for example, by the fusion step depicted in step 150.

At least one machine learning model 125 is applied to the features 145, thereby generating score 130, wherein the score indicates the likelihood of malware being present in a host or network device in network 105. The machine learning model 125 may be trained prior to applying the machine learning model to the extracted features. The training may include at least one of the following: scoring network traffic based on similarity to malicious behavior by software executing on a network-connected host system; scoring network based on similarity to benign or non-malicious behavior by software executing on a network-connected host system; scoring network traffic based on similarity to malicious behavior associated with specific classes of malware; and combining the scores from multiple concurrent models to produce a normalized, comparable score associated with the time interval using support vector machines and Bayesian networks.

In one embodiment, a machine learning model 125 may include a set of supervised learning algorithms, such as Boosted Decision Trees, Support Vector Machines, and Gaussian Mixture Models. One or more of a plurality of machine learning models may be specified as part of a predefined configuration or may be specified by a user.

The machine learning module 125 may accept extracted features 120 as inputs, and may produce a score as an output for each set of inputs. The score 130 is produced using the provided feature vector set depicted in block 145 along with the specified model and model configuration 125 (e.g., Support Vector Machine with a trained SVM model). A one embodiment, a statistical confidence may be associated with detection events for indicating the effectiveness of potential remediation policy or actions.

The generated score 130 may provide a relative measure of the likelihood of malware presence on each computing system. Using the generated score 130, a computing device may, for each time interval/window, and for each utilized model, provide an ordered list of computing systems most likely to host a specific class of malware. Scores from multiple, concurrent Scoring Systems (i.e., computing systems implementing the aforementioned feature extraction and Machine Learning algorithms) may be combined and compared using a computing device. In one embodiment, the aforementioned combining of scores may comprise ranking the relative magnitude of the scores. For example, if score a is greater than score a', the computing resource associated with score a is more likely to host a malicious software program and/or more likely to host a malicious software program of a specific class.

Figure 2:
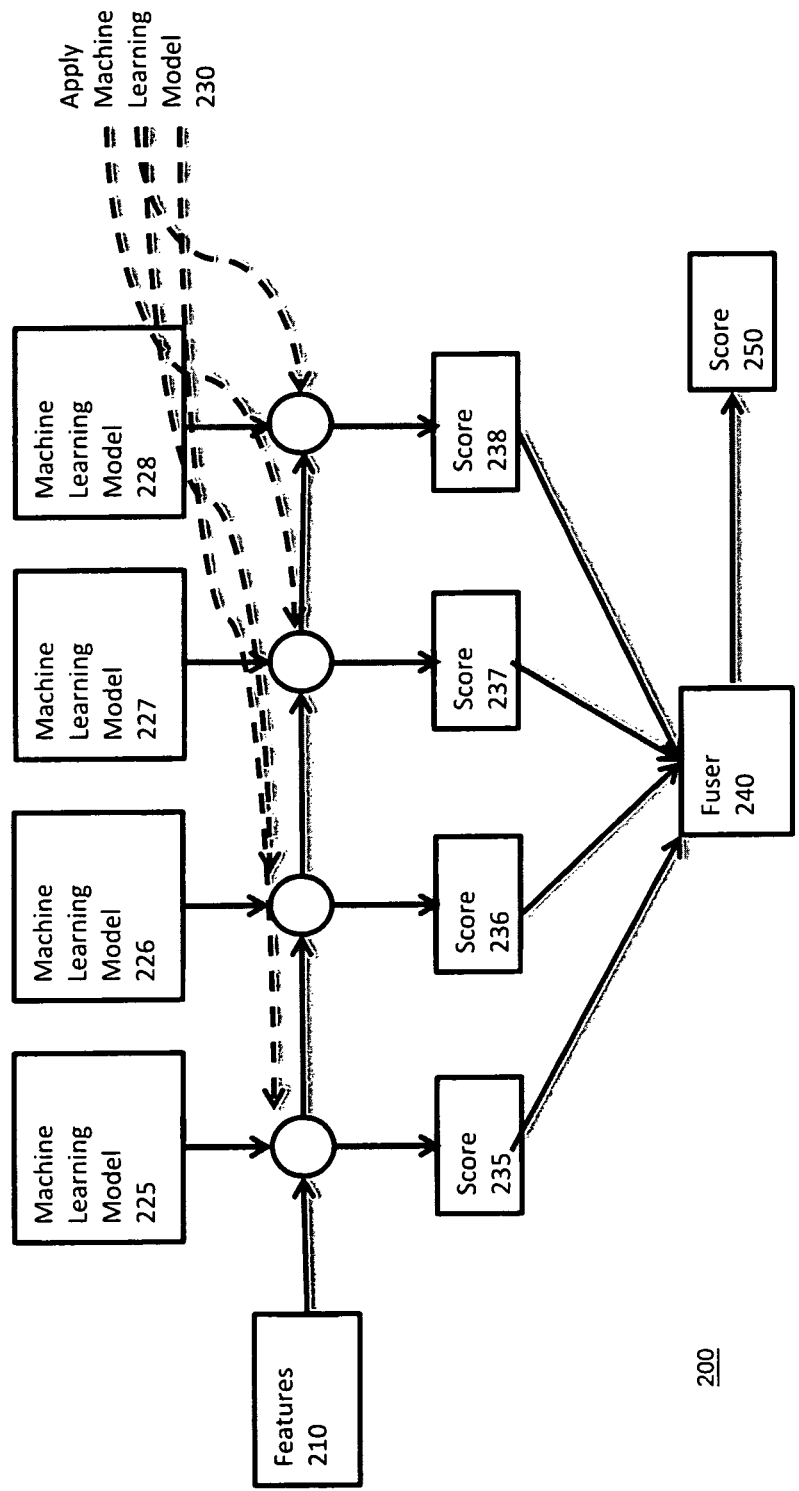
FIG. 2 depicts a block diagram of exemplary system in accordance with one or more embodiments wherein more one of a plurality of machine learning models are applied to features.

FIG. 2 depicts a block diagram of an exemplary system 200 in accordance with one or more embodiments, in which a plurality of machine learning models are applied to features from system 100. The scores from the machine learning models may be submitted to a fuser which generates a combined score. Block 210 depicts features, such as those discussed with respect to system 100. Blocks 225, 226, 227, and 228 depict one or more machine learning models from a plurality of machine learning models being applied to the features 210 and generating a set of scores, 235, 236, 237 and 238. Fuser 240 may be a Machine Learning component or model that takes as input scores generated by other Machine Learning Components. It accepts as input scores from machine learning components 225, 226, 227 and 228. The fuser 240 may output a single aggregate score. The aggregate score may indicate the degree to which the observed Network Samples shows similarity to that of a class of malicious software executing on a particular network computing resource. The fuser depicted in block 240 may include machine learning algorithms such as Support Vector Machines or Bayesian Networks. or Probabilistic Graphical Models (PGM.)

In one or more embodiments of this invention, scores from one or more machine learning models 225, 226, 227 and 228, or one or more fusers 240, may be combined and compared. The aforementioned combining of scores may comprise ranking the relative magnitude of the scores. For example, if score a>score a', the computing resource associated with score a is more likely to host a malicious software program and/or more likely to host a malicious software program of a specific class.

Figure 3:
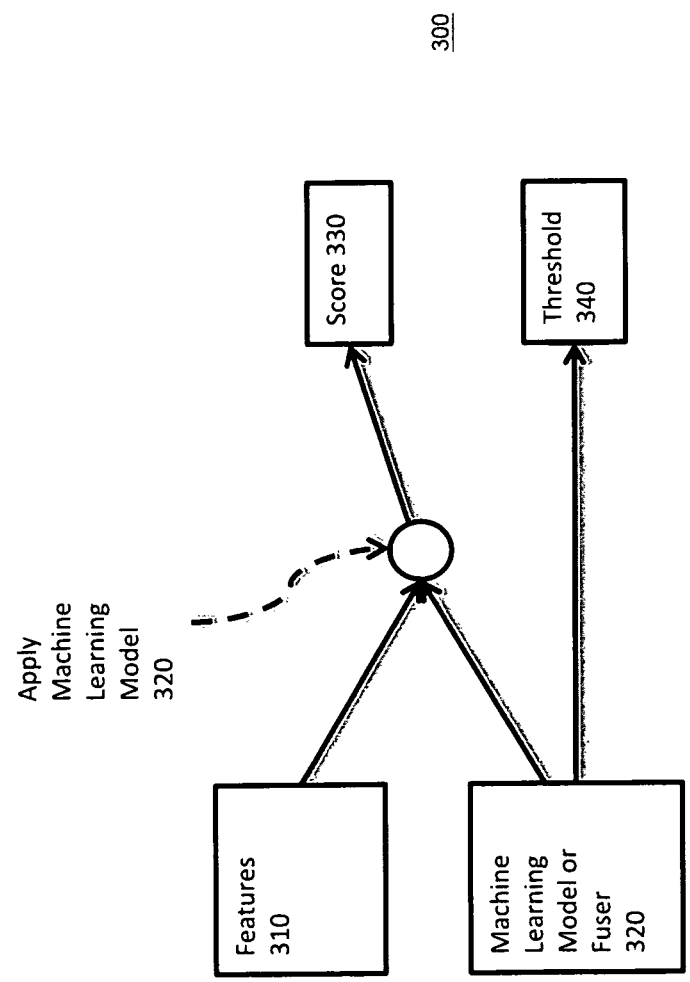
FIG. 3 depicts a block flow diagram of an exemplary system in accordance with one or more embodiments wherein at least one of a fuser or machine learning model may provide a threshold to accompany the score.

FIG. 3 depicts a block diagram of exemplary system 300, in which the machine learning model or fuser depicted in block 320 includes a threshold 340. The threshold 340 is calculated as part of the a priori training of a machine learning model or fuser. For example, the threshold 340 may be associated with a score generated by one of a fuser or another machine learning model. The machine learning model 360 may be applied to generate score 330 in a manner similar to the previous embodiments.

The a priori training process to create the model 125 may include generation of statistics associated with the accuracy and performance of the Machine Learning Model, wherein the statistics may include the statistical means of the predicted output scores for positive and negative samples. The statistics may also include statistical standard deviations of the predicted output scores for positive and negative samples. For example, scores may be used to identify computing resources on the network that, with likelihood p, are executing a malicious software program and/or with likelihood p', may host a malicious software program of a specific type or class.

Threshold 340 may be a value such that the probability of a false positive equals the probability of a false negative. For example, a threshold may be calculated by evaluating a machine learning model against a labeled set (e.g., a set of samples wherein each sample is labeled as being of type A or type B, where A could be known malware and B could be known to be benign). In this example a series of evaluations may be run in which a proposed threshold is selected (e.g.; 0.4, 0.5, 0.6. Etc. where the threshold is within the range of possible scores produced). For a given threshold, scores greater than a particular value may be considered 'in group B' while scores less than the threshold may be considered to be 'in group A'. (If A is encoded as a 0.0 and B is encoded as 1.0 I the labeling process.) Each evaluation may produce some number of "classification errors" defined as a sample from one group being assigned to the other group. In this exemplary embodiment, an equal error rate threshold may be calculated. An Equal Error Rate threshold is defined as the threshold for which the number of false positives (e.g., sample from group A being assigned to group B) most closely matches the number of false negatives (e.g., sample from group B being assigned to group A). A score below the threshold may indicate the absence of malware and a score above the threshold may indicate the presence of malware. In one embodiment, this threshold may be used as a trigger or alarm for malware detection.

Figure 4:
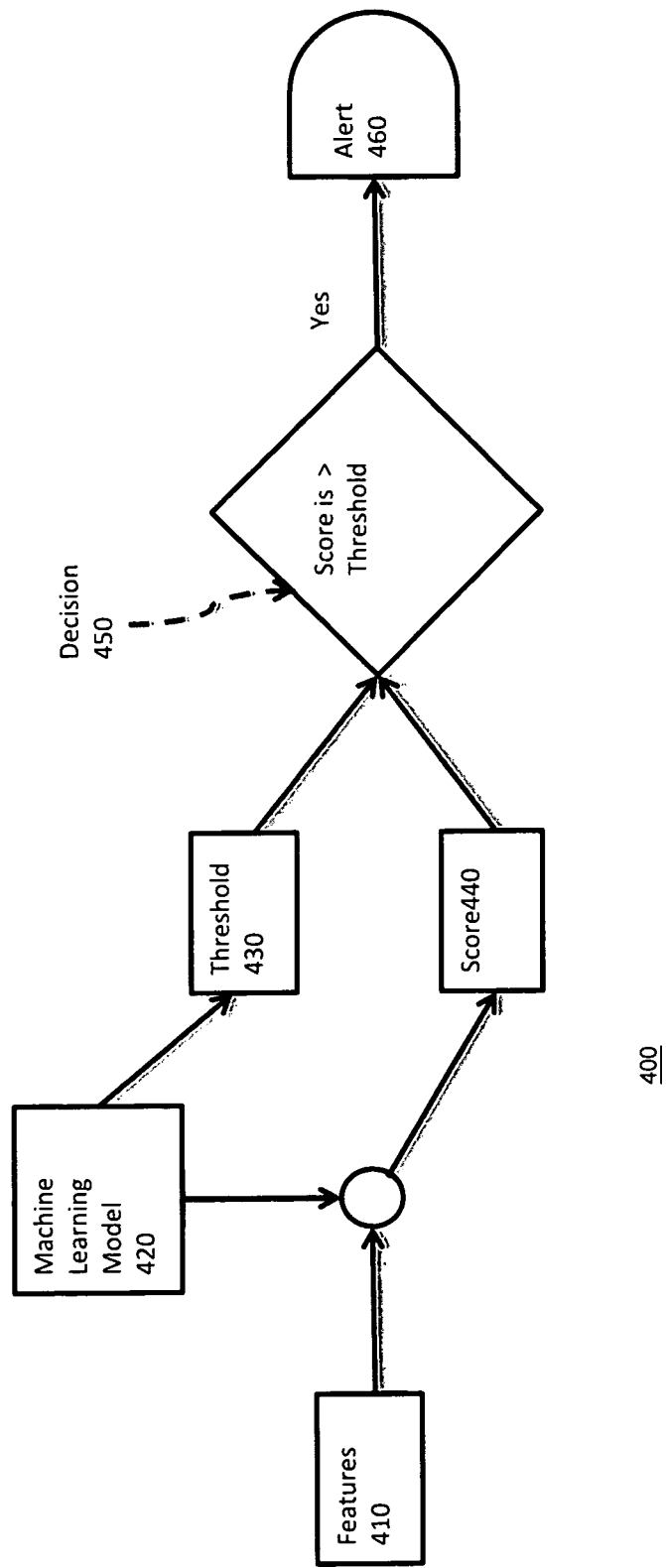
FIG. 4 depicts a block flow diagram of an exemplary system in accordance with one or more embodiments wherein at least one of a plurality of machine learning models is applied to a set of features, a score is calculated, and an alert is generated if the score is greater than the threshold.

FIG. 4 depicts system 400 in which an alert is produced indicating the presence of malware in the system.

The generated score 440 may provide a relative measure of the likelihood of malware presence on each computing system. Using the generated score, 440 and the threshold 430 associated with the machine learning model 420, for each time interval/window, and for each utilized model, an ordered list of computing systems can be calculated which are most likely to host a specific class of malware.

As exemplified by system 400, one or more thresholds 430 may indicate the effectiveness of subsequent actions (e.g., alarm, remediation, quarantine, etc.) may also be implemented using a computing device. For example, at decision 450, the model 420 may have an associated threshold, t, 430, such that a score depicted in block 440 greater than t may indicate the likelihood that a particular computing resource 106 and 107 in computer network depicted in block 105 in system 100 has a malicious software program and/or more specifically has a malicious software program of a specific class. Conversely, a score less than t may indicate the likelihood that a computing resource does not host a malicious software program and/or does not host a malicious software program of a specific class and no action is required.

In system 400, alert 460 may be generated to inform users when the results of new analyses are available. For example, a user may a priori have indicated the user's desire to receive notice of the suspected presence of a particular instance, type, or class of malware. When a new analysis of a sample is performed, and the analysis may indicate that the sample matches the user's indicated instance, type, or class. System 400 may transmit an alert 460 to the user when the new analysis is available. In one or more embodiments, alert 460 may include the timestamp for the identification, the name of the file containing the triggering malware, or the name or IP address of the host containing the triggering malware, the SHA1 or other unique hash for the malware binary file, the alert, and the name of the type of alert that was triggered. In one or more embodiments, a URL may also be provided to the user who may be used to view any meta-data or report information generated for the sample.

Figure 5:
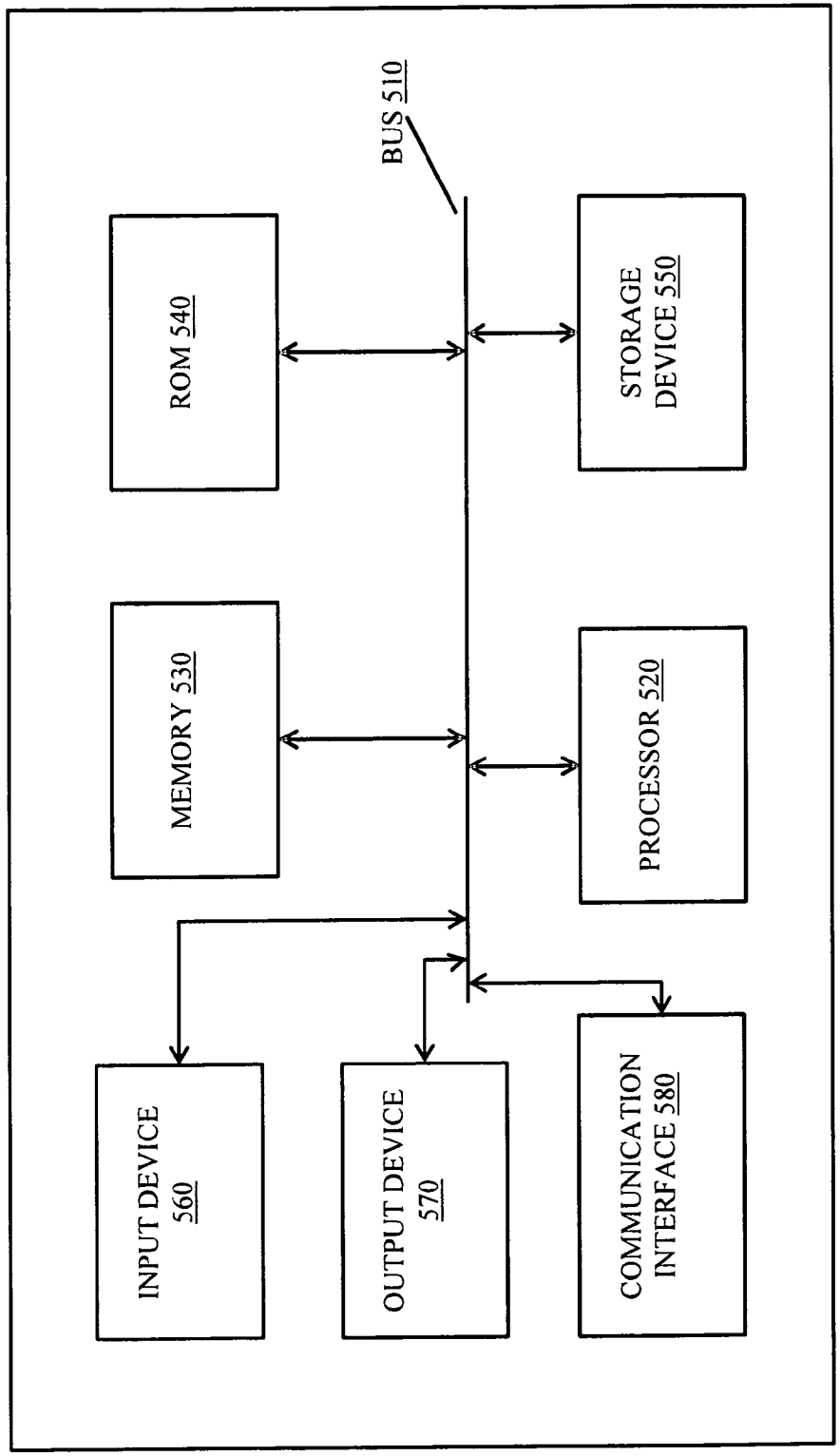
FIG. 5 depicts an exemplary architecture for implementing a computing device in accordance with one or more embodiments.

FIG. 5 depicts an exemplary architecture for implementing a computing device 500 in accordance with one or more embodiments, which may be used to implement any of the computing devices, or any other computer system or computing device component thereof. It will be appreciated that other devices that can be used with the computing device 500, such as a client or a server, may be similarly configured. As illustrated in FIG. 5, computing device 500 may include a bus 510, a processor 520, a memory 530, a read only memory (ROM) 540, a storage device 550, an input device 560, an output device 570, and a communication interface 580.

Bus 510 may include one or more interconnects that permit communication among the components of computing device 500. Processor 520 may include any type of processor, microprocessor, or processing logic that may interpret and execute instructions (e.g., a field programmable gate array (FPGA)). Processor 520 may include a single device (e.g., a single core) and/or a group of devices (e.g., multi-core). Memory 530 may include a random access memory (RAM) or another type of dynamic storage device that may store information and instructions for execution by processor 520. Memory 530 may also be used to store temporary variables or other intermediate information during execution of instructions by processor 520.

ROM 540 may include a ROM device and/or another type of static storage device that may store static information and instructions for processor 520. Storage device 550 may include a magnetic disk and/or optical disk and its corresponding drive for storing information and/or instructions. Storage device 550 may include a single storage device or multiple storage devices, such as multiple storage devices operating in parallel. Moreover, storage device 550 may reside locally on the computing device 500 and/or may be remote with respect to a server and connected thereto via network and/or another type of connection, such as a dedicated link or channel.

Input device 560 may include any mechanism or combination of mechanisms that permit an operator to input information to computing device 500, such as a keyboard, a mouse, a touch sensitive display device, a microphone, a pen-based pointing device, and/or a biometric input device, such as a voice recognition device and/or a finger print scanning device. Output device 570 may include any mechanism or combination of mechanisms that outputs information to the operator, including a display, a printer, a speaker, etc.

Communication interface 580 may include any transceiver-like mechanism that enables computing device 500 to communicate with other devices and/or systems, such as a client, a server, a license manager, a vendor, etc. For example, communication interface 580 may include one or more interfaces, such as a first interface coupled to a network and/or a second interface coupled to a license manager. Alternatively, communication interface 580 may include other mechanisms (e.g., a wireless interface) for communicating via a network, such as a wireless network. In one implementation, communication interface 580 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 500 may perform certain functions in response to processor 520 executing software instructions contained in a computer-readable medium, such as memory 530. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present disclosure should not be limited by any of the above-described exemplary embodiments, but should instead be defined only in accordance with the following claims and their equivalents.

The invention claimed is:

1. A computer-implemented method for detecting malware executed by one or more processors, the method comprising:
    monitoring, by the one or more processors, network traffic transmitted on a computer network during a time interval;
    obtaining, by the one or more processors, a plurality of samples of the network traffic during the time interval;
    extracting, by the one or more processors, a set of features from the samples of the network traffic;
    training, by the one or more processors, at least one machine learning model, wherein training the at least one machine learning model comprises:
        generating a first machine learning model configured to detect malware associated with a plurality of malware classes and to classify network traffic executed on a network-connected host system that is similar to malicious behavior associated with any one of the plurality of malware classes;
        generating a second machine learning model configured to classify, as benign traffic, network traffic executed on a network-connected host system that is similar to benign software behavior; and
        generating a third machine learning model configured to detect a particular class of malware and to classify network traffic executed on the network-connected host system that is similar to malicious behavior associated with the particular class of malware;
generating, by the one or more processors, a normalized score based on applying the at least one trained machine learning model to the extracted set of features, wherein generating the normalized score comprises:
applying the first machine learning model to the extracted set of features to generate a first score;
applying the second machine learning model to the extracted set of features to generate a second score;
applying the third machine learning model to the extracted set of features to generate a third score; and
generating the normalized score associated with the time interval based on a combination of the first score, the second score, and the third score;
determining, by the one or more processors and from the normalized score, a likelihood that a particular network component is infected with malware; and
storing, by the one or more processors, data indicating the likelihood that the particular network component is infected with malware.

2. The method of claim 1, the method further comprising:
identifying one or more of a classification for the malware infecting the particular network component and a type of the malware infecting the particular network component.

3. The method of claim 1, wherein the malware likely to be infecting the particular network component comprises at least one of a malicious software program, a virus, a worm, a trojan horse, a rootkit, a keylogger, spyware, adware, or rogue security software.

4. The method of claim 1, wherein the samples of network traffic comprise at least one of:
sFlow derived from sampled traffic;
copies of whole captured packets from the network traffic;
Internet Protocol Flow Information Export (IPFIX) derived from sampled traffic;
Netflows derived from sampled traffic; or
packet captures (PCAP) of some or all of the packets in the network traffic.

5. The method of claim 1, wherein determining the likelihood that the particular network component is infected with malware comprises comparing the normalized score to a threshold value.

6. The method of claim 5, further comprising:
determining that the normalized score exceeds the threshold value; and
in response determining that the normalized score exceeds the threshold value, providing one or more of (i) an alert for display to a user, and (ii) an alert to invoke a remediation strategy.

7. The method of claim 1, wherein the at least one machine learning model comprises a set of supervised learning algorithms comprising at least one of:
Boosted Decision Trees;
Support Vector Machines; or
Gaussian Mixture Models.

8. The method of claim 1, wherein
the first score and the second score are combined using a fuser.

9. The method of claim 8, wherein the fuser includes a machine learning model that accepts input scores from other machine learning models and generates an aggregate score based on the input scores.

10. The method of claim 8, wherein the fuser utilizes at least one of:
Support Vector Machines;
Bayesian Networks; or
Probabilistic Graphical Models (PGM).

11. The method of claim 1, wherein extracting the set of features from the samples of the network traffic comprises generating at least one feature vector from the extracted set of features from the samples of the network traffic.

12. The method of claim 11, wherein the at least one feature vector comprises:
a count of distinct connections;
average entropy per packet; or
overall entropy across packets.

13. The method of claim 11, wherein the at least one feature vector comprises:
a time series formed by entropies of successive packets;
a time series formed from sizes of internet protocol (IP) packets; or
a time series formed by successive destination port accesses across connections.

14. The method of claim 11, wherein the at least one feature vector comprises:
a mean and variance of distinct transmission control protocol (TCP) sequence numbers per packets associated with a connection;
a mean and variance of difference in bytes sent between peers of either user datagram protocol (UDP) or TCP connections;
a mean number and variance of packets associated with a connection;
a mean and variance of distinct IP addresses per TCP or UDP port; or
a mean and variance of distinct ports per IP address.

15. The method of claim 11, wherein the at least one feature vector comprises packets per unit time or packet size mean and variance across connections.

16. The method of claim 11, wherein the at least one feature vector comprises:
a ratio of a number of domain name system (DNS) lookups to a number of distinct destination IP addresses;
a percentage of packets of one of the plurality of packet types UDP, TCP, address resolution protocol (ARP), internet control message protocol (ICMP) and raw IP; or
a number of SYN flags and FIN flags per time window.

17. The method of claim 11, wherein the at least one feature vector comprises discrete wavelet transformations (DWT) of selected combinations of features.

18. The method of claim 1, wherein the particular network component is a host computer, a virtual computer, a server, a printer, a router, a switch, or a bridge.

19. The method of claim 1, wherein generating the normalized score associated with the time interval based on a combination of the first score, the second score, and the third score comprises:
combining the first training score, the second training score, and the third training score using support vector machines and Bayesian networks.

20. The method of claim 1, wherein determining, by the one or more processors and from the normalized score, the likelihood that the particular network component is infected with malware comprises:
determining a likelihood that the particular network component hosts the particular class of malware.

21. The method of claim 1, further comprising:
determining a threshold associated with the third machine learning model, wherein determining, by the one or more processors and from the normalized score, the likelihood that the particular network component is infected with malware comprises:
   determining that the particular network component hosts the particular class of malware in response to the third score satisfying the threshold associated with the third machine learning model.

22. A system comprising:
one or more processors; and
a non-transitory computer-readable medium coupled to the one or more processors having instructions stored thereon which, when executed by the one or more processors, causes the one or more processors to perform operations comprising:
   monitoring, by the one or more processors, network traffic transmitted on a computer network during a time interval;
   obtaining, by the one or more processors, a plurality of samples of the network traffic during the time interval;
   extracting, by the one or more processors, a set of features from the samples of the network traffic;
   training, by the one or more processors, at least one machine learning model, wherein training the at least one machine learning model comprises:
      generating a first machine learning model configured to detect malware associated with a plurality of malware classes and to classify network traffic executed on a network-connected host system that is similar to malicious behavior associated with any one of the plurality of malware classes;
      generating a second machine learning model configured to classify, as benign traffic, network traffic executed on a network-connected host system that is similar to benign software behavior; and
      generating a third machine learning model configured to detect a particular class of malware and to classify network traffic executed on the network-connected host system that is similar to malicious behavior associated with the particular class of malware;
   generating, by the one or more processors, a normalized score based on applying the at least one trained machine learning model to the extracted set of features, wherein generating the normalized score comprises:
      applying the first machine learning model to the extracted set of features to generate a first score;
      applying the second machine learning model to the extracted set of features to generate a second score;
      applying the third machine learning model to the extracted set of features to generate a third score; and
      generating the normalized score associated with the time interval based on a combination of the first score, the second score, and the third score;
   determining, by the one or more processors and from the normalized score, a likelihood that a particular network component is infected with malware; and
   storing, by the one or more processors, data indicating the likelihood that the particular network component is infected with malware.

23. A non-transitory computer-readable medium encoded with a computer program comprising instructions that, when executed, operate to cause one or more processors to perform operations comprising:
   monitoring, by the one or more processors, network traffic transmitted on a computer network during a time interval;
   obtaining, by the one or more processors, a plurality of samples of the network traffic during the time interval;
   extracting, by the one or more processors, a set of features from the samples of the network traffic;
   training, by the one or more processors, at least one machine learning model, wherein training the at least one machine learning model comprises:
      generating a first machine learning model configured to detect malware associated with a plurality of malware classes and to classify network traffic executed on a network-connected host system that is similar to malicious behavior associated with any one of the plurality of malware classes;
      generating a second machine learning model configured to classify, as benign traffic, network traffic executed on a network-connected host system that is similar to benign software behavior; and
      generating a third machine learning model configured to detect a particular class of malware and to classify network traffic executed on the network-connected host system that is similar to malicious behavior associated with the particular class of malware;
   generating, by the one or more processors, a normalized score based on applying the at least one trained machine learning model to the extracted set of features, wherein generating the normalized score comprises:
      applying the first machine learning model to the extracted set of features to generate a first score;
      applying the second machine learning model to the extracted set of features to generate a second score;
      applying the third machine learning model to the extracted set of features to generate a third score; and
      generating the normalized score associated with the time interval based on a combination of the first score, the second score, and the third score;
   determining, by the one or more processors and from the normalized score, a likelihood that a particular network component is infected with malware; and
   storing, by the one or more processors, data indicating the likelihood that the particular network component is infected with malware.

* * * * *